United States Patent

Kayashima et al.

[11] Patent Number: 5,550,655
[45] Date of Patent: Aug. 27, 1996

[54] LASER BEAM OPTICAL SCANNER

[75] Inventors: Shigeo Kayashima; Shinya Hasegawa; Satoshi Maeda; Hirokazu Aritake, all of Kawasaki, Japan

[73] Assignee: Fujitsu Limited, Kawasaki, Japan

[21] Appl. No.: 232,344

[22] Filed: Apr. 22, 1994

Related U.S. Application Data

[63] Continuation of Ser. No. 964,909, Oct. 22, 1992, abandoned.

[30] Foreign Application Priority Data

Oct. 25, 1991 [JP] Japan .................................. 3-279800

[51] Int. Cl.⁶ .......................... G03H 1/22; G02B 36/10; G02B 5/32
[52] U.S. Cl. .......................... 359/17; 359/18; 359/566; 250/227.26
[58] Field of Search .......................... 359/17, 18, 566; 250/227.26

[56] References Cited

U.S. PATENT DOCUMENTS

| | | | |
|---|---|---|---|
| 4,289,371 | 9/1981 | Kramer | 359/563 |
| 4,428,643 | 1/1984 | Kay | 359/17 |
| 4,621,891 | 11/1986 | Noguchi | 359/17 |
| 4,810,046 | 3/1989 | Yamagishi et al. | 359/17 |
| 4,852,956 | 8/1989 | Kramer | 359/563 |
| 4,923,262 | 5/1990 | Clay | 359/17 |
| 4,948,213 | 8/1990 | Hasegawa et al. | 359/18 |
| 4,957,336 | 9/1990 | Hasegawa et al. | 359/18 |
| 4,973,112 | 11/1990 | Kramer | 359/18 |
| 4,993,789 | 2/1991 | Biles et al. | 359/18 |
| 5,013,107 | 5/1991 | Biles | 359/17 |
| 5,054,884 | 10/1991 | Kubota | 359/566 |
| 5,189,533 | 2/1993 | Taguchi et al. | 359/18 |

OTHER PUBLICATIONS

Hasegawa et al, Appl. Opt., vol. 30, #7, pp. 823–832, Mar. 1, 1991; abst. only supplied.
Yamagishi et al, Fujitsu Scientific Tech. Journal, V. 22, #5, Dec. 1986, pp. 416–426; abst. only.
Yamagishi et al, Fujitsu, vol. 42, #3, pp. 243–249, 1991; abst. only supplied.
Yamagishi et al, Int. Soc. for Opt. Eng., vol. 615, pp. 126–132, Jan. 1986; abst. only supplied.

*Primary Examiner*—Nelson Moskowitz
*Attorney, Agent, or Firm*—Staas & Halsey

[57] ABSTRACT

A laser beam passes through two holograms or through a hologram twice to reduce the ratio $\lambda/d$ so that P-polarized light, as well as S-polarized light, can be diffracted with high diffraction efficiency and uses a hologram or holograms formed on a base plate and facilitates the separation of a stamper from the base plate in producing replicas of the hologram. A laser beam (5) passes through two holograms formed on a transparent base plate or through a hologram formed on a transparent base plate twice. The ratio $\lambda/d$, where $\lambda$ is the wavelength of the laser beam and d is the grating constant of the hologram, is in the range of 0.4 to 1.1.

3 Claims, 12 Drawing Sheets

$\eta_1$ = HOLOGRAPHIC DIFFRACTION EFFICIENCY $\lambda$ = WAVE LENGTH OF LASER BEAM d = PITCH OF HOLOGRAM DIFFRACTION GRATING

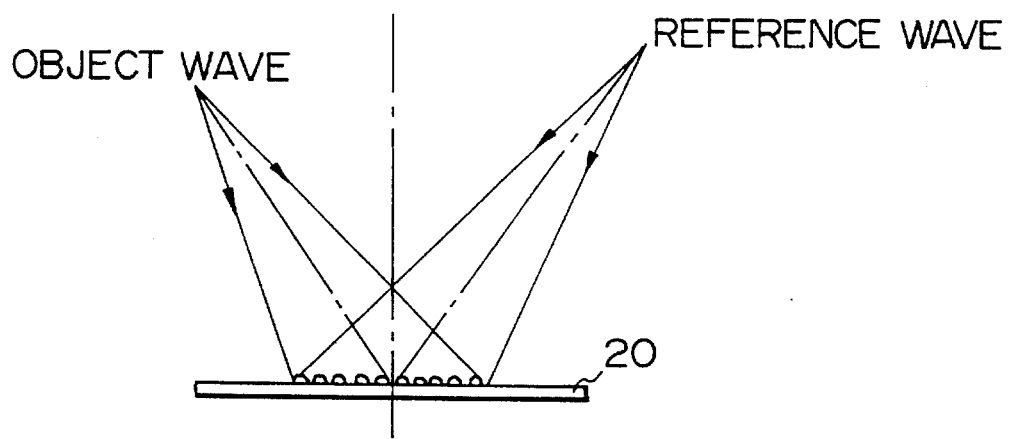
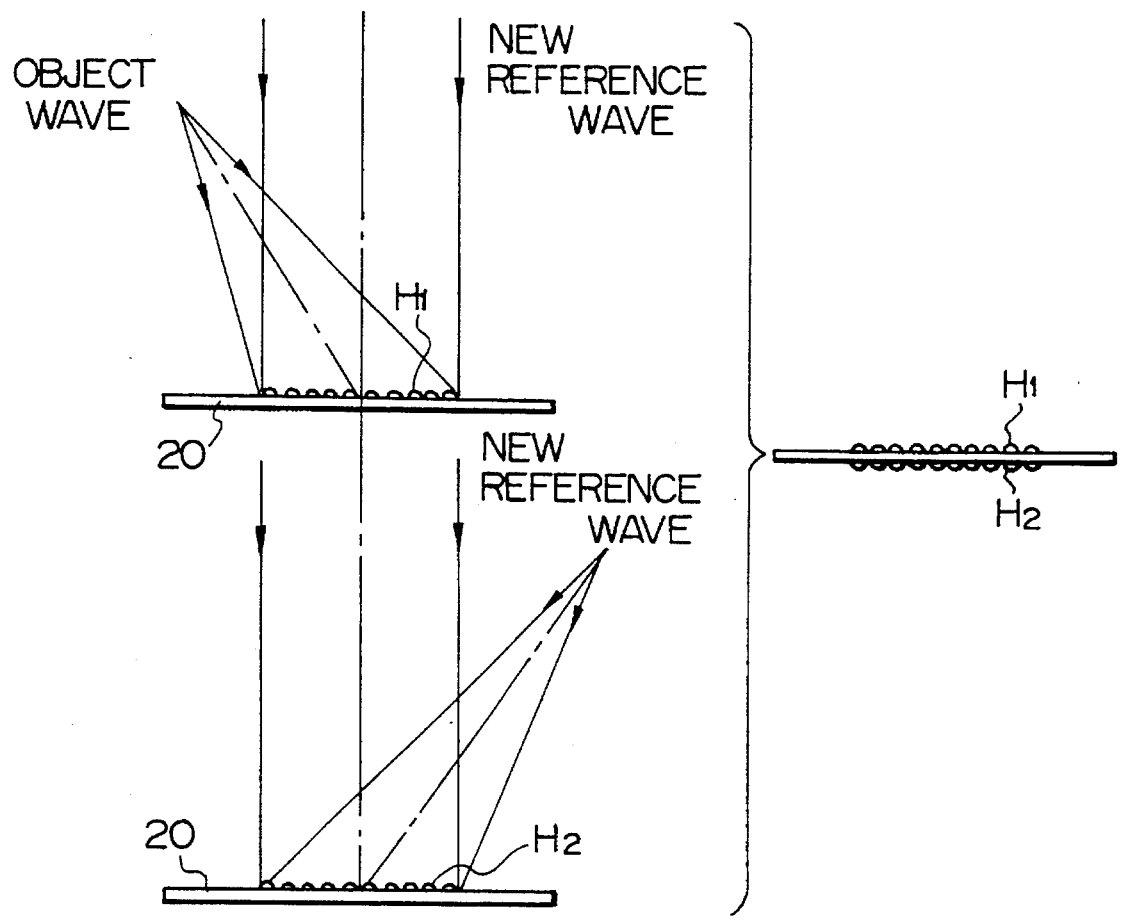

LASER BEAM OPTICAL SCANNER

This application is a continuation of application Ser. No. 07/964,909, filed Oct. 22, 1992, now abandoned.

BACKGROUND OF THE INVENTION

1. Field of the Invention

The present invention relates to an optical scanner and, more particularly, to an optical scanner using a laser beam for scanning.

2. Related Art

A prior art laser scanner incorporated into office automation equipment, such as a laser printer or a laser facsimile terminal equipment, a laser plotter, a laser inspection device or the like comprises, in combination, a polygonal rotating mirror and an f-θ lens. This prior art laser scanner, however, has disadvantages in that the polygonal rotating mirror must be fabricated with high accuracy and the f-θ lens consisting of a plurality of lenses is expensive, and hence it is difficult to reduce the cost of the laser scanner. On the other hand, since replicas of a hologram can be produced by mass production, the hologram scanner can be manufactured at a relatively low cost.

SUMMARY OF THE INVENTION

An object of the present invention is to provide a optical scanner using holograms through which a laser beam passes.

Another object of the present invention is to provide an optical scanner that passes a laser beam through two holograms to reduce the ratio $\lambda/d$, for example, to a value in a range represented by $0.4 \leq \lambda/d \leq 1.1$, in passing the laser beam through each hologram to increase the value of diffraction efficiency for a P-polarized light to a value as high as the value of diffraction efficiency for a S-polarized light, and uses a hologram plate to facilitate the separation of the stamper from the base plate when producing a replicas of the hologram.

According to a first aspect of the present invention, an optical scanner comprises an arrangement to project a laser beam so that the laser beam travels through two holograms formed on a transparent plate, and is characterized in that the ratio $\lambda/d$, wherein $\lambda$ is the wavelength of the laser beam traveling through each hologram and d is the grating constant of the holographic diffraction grating, is in the range of 0.4 to 1.1.

In a second aspect of the present invention, in the optical scanner in the first aspect of the present invention, the holograms are formed, respectively, on opposite surfaces of the transparent plate, and the laser beam is diffracted once by each of the holograms.

In a third aspect of the present invention, in the optical scanner in the first aspect of the present invention, a hologram is formed on one of the opposite surfaces of the transparent plate and a mirror is formed on the other surface of the same to reflect the laser beam, as diffracted by the hologram, by the mirror so that the diffracted laser beam is diffracted again by the same hologram.

In a fourth aspect of the present invention, in the optical scanner in the second or third aspect of the present invention, the transparent plate is rotatable.

In a fifth aspect of the present invention, the optical scanner in the second or third aspect of the present invention is provided with a fixed hologram plate (20) having a hologram.

In a sixth aspect of the present invention, an optical scanner, that uses a transparent, rotary plate having holograms and a transparent, fixed plate having a hologram, projects a laser beam along the feed direction perpendicular to the scanning direction so that the laser beam converges on the rotary plate, the laser beam diffracted by the rotary plate falls on the fixed plate and the laser beam diffracted by the fixed plate converges on an image forming surface, and is characterized in that the laser beam is projected on the rotary plate so that the direction of polarization of the laser beam is perpendicular to the grating direction of the center of scanning; the laser beam incident on the rotary plate passes through the two holograms formed on the rotary plate, and the ratio $\lambda/d$, wherein $\lambda$ is the wavelength of the laser beam passing through each hologram and d is the grating constant of the holographic diffraction grating, is in the range of 0.4 to 1.1.

In a seventh aspect of the present invention and in the optical scanner of the sixth aspect of the present invention, the hologram on one surface of the rotary plate is formed by a plane wave perpendicular to the surface of the rotary plate and a wave having an aberration of a first angle, and the hologram on the other surface of the rotary plate is formed by a plane wave perpendicular to the surface of the rotary plate and a wave having an aberration of a second angle different from the first angle.

In an eighth aspect of the present invention, in the optical scanner in the sixth aspect of the present invention, the hologram on one surface of the rotary plate is formed by a plane wave having a third angle and a wave having an aberration of the first angle, and the hologram on the other surface of the rotary plate is formed by a plane wave having the third angle and a wave having the second angle different from the first angle.

In a ninth aspect of the present invention, in the optical scanner in the sixth aspect of the present invention, the hologram on one surface of the rotary plate is formed by a divergent spherical wave having a fourth angle and a predetermined focal length and a wave having an aberration of the first angle, and the hologram on the other surface of the rotary plate is formed by a convergent spherical wave having the third angle and the predetermined focal length and a plane wave having the second angle different from the first angle.

In a tenth aspect of the present invention, in the optical scanner in the sixth aspect of the present invention, a hologram is formed on one surface of the transparent rotary plate, a mirror is formed on the other surface of the transparent rotary plate, and a laser beam diffracted by the hologram is reflected by the mirror so that the laser beam is diffracted again by the same hologram.

According to the present invention, the laser beam travels through the two holograms, and the value of the ratio $\lambda/d$ is, for example, as small as a value in the range of $0.4 \leq \lambda/d \leq 1.1$. Therefore, the diffraction efficiency for a P-polarized light can be high as as that for an S-polarized light, and the reduction of the quantity of light on the image forming plane can be prevented. Since the spatial frequency of the holograms can be significantly reduced, the stamper can be easily separated from the base plate when producing replicas of the holograms.

BRIEF DESCRIPTION OF THE DRAWINGS

FIGS. 12(a) and 12(b) are diagrammatic views explaining a hologram forming method of a fifth embodiment according to the present invention.

DETAILED DESCRIPTION OF THE PREFERRED EMBODIMENTS

Figure 1:
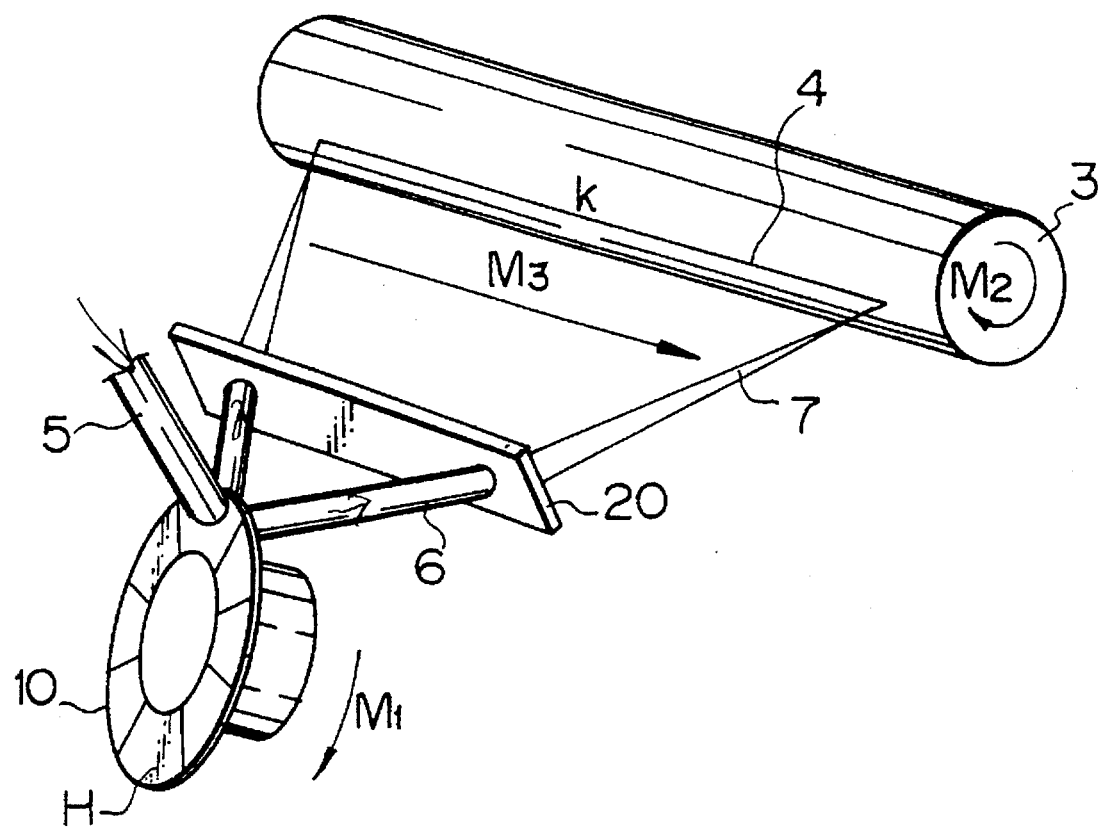
FIG. 1 is a perspective view of a holographic scanner proposed previously in Japanese Patent Application No. Hei 3-62961 by the applicant of the present patent application.

Referring to FIG. 1 showing a hologram scanner proposed in Japanese Patent Application No. Hei 3-62961, there are shown a photoconductive drum 3, an image forming surface 4 formed over the circumference of The photoconductive drum 3, an incident laser beam 5, diffracted waves 6 and 7, a rotary hologram plate 10 carrying a plurality of holograms H (FIG. 4) and capable of being rotated at a high rotating speed and a fixed hologram plate 20. The arrows M1, M2 and M3 indicate the direction of rotation of the rotary hologram plate 10, the direction of rotation of the photoconductive drum 20 and the scanning direction of the laser beam, respectively. The laser beam (incident laser beam 5) from a semiconductor laser, not shown, falls on the rotary hologram plate 10 rotating at a high rotating speed (e.g., at =8,000–10,000 RPM) in the direction of the arrow M1 to scan the laser beam 5. A diffracted wave 6 produced by scanning the laser beam 5 by the rotary hologram plate 10 is converged on the image forming surface 4 of the photoconductive drum 3, rotating in the direction of the arrow M2, by the fixed hologram 20 for constant-speed linear scanning in the direction of the arrow M3. The under number of dots in a unit length is about 400 dots/inch.

Figure 2A:
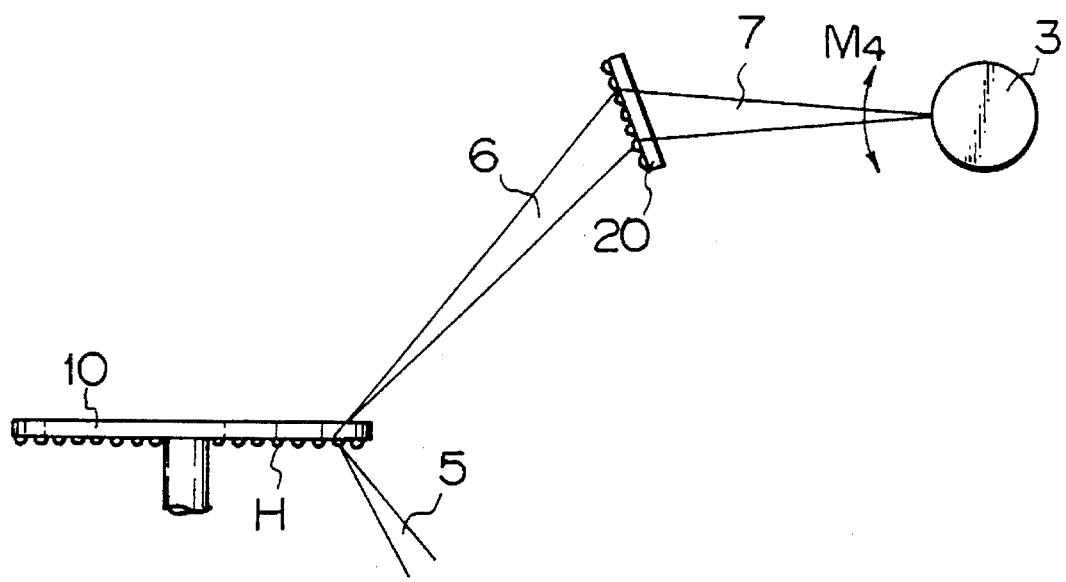
FIGS. 2(a) and 2(b) are diagrammatic views explaining an arrangement for compensating the positional variation of scanning lines attributable to the parallelism of the base plate of a rotary hologram plate 10.
Figure 2B:
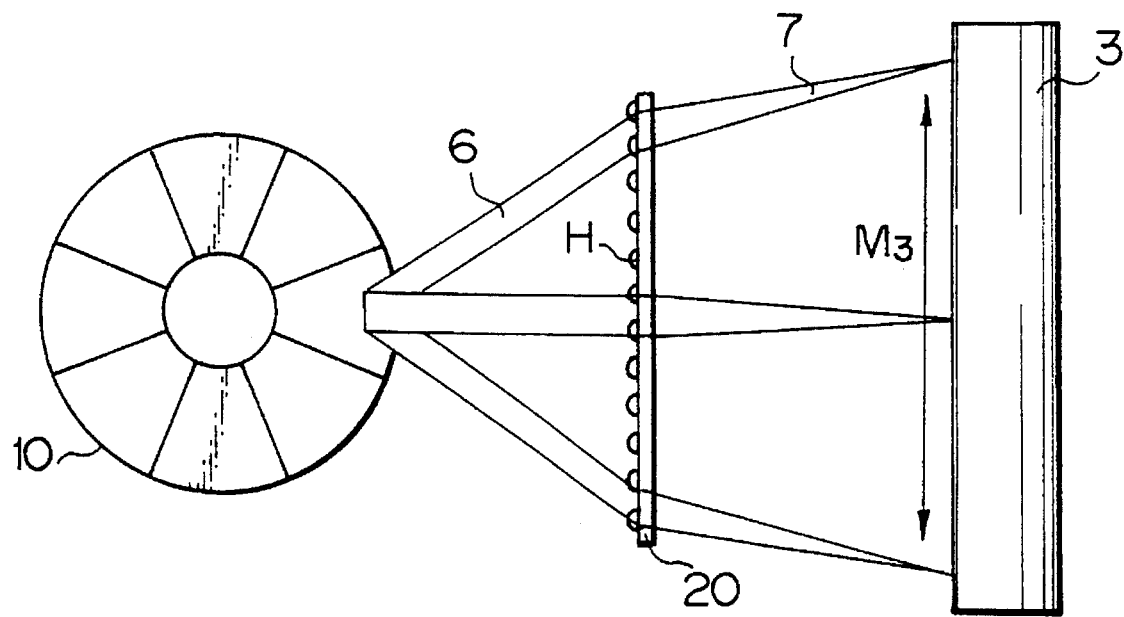

FIGS. 2(a) and 2(b) are elevation and plan views of an arrangement for compensating for the positional variation of scanning lines attributable to the parallelism of the base plate of a rotary hologram plate 10. Shown in FIGS. 2(a) and 2(b) are a photoconductive drum 3, an incident wave 5, diffracted waves 6 and 7, a rotary hologram plate 10, a fixed hologram plate 20 and a hologram H. The arrows M3 and M4 indicate the scanning direction and the feed direction perpendicular to the scanning direction, respectively. The light beam incident on the rotary hologram plate 10 converges with respect to the feed direction indicated by the arrow M4. The ratio $\lambda/d$, where $\lambda$ is the wavelength of the laser beam and d is the grating constant of the holographic diffraction grating, is in the range of 1.4 to 1.5. Refer to Japanese Patent Application No. Hei 3-62961 for the further details of the arrangement for compensating the positional variation of the scanning line.

Figure 3A:
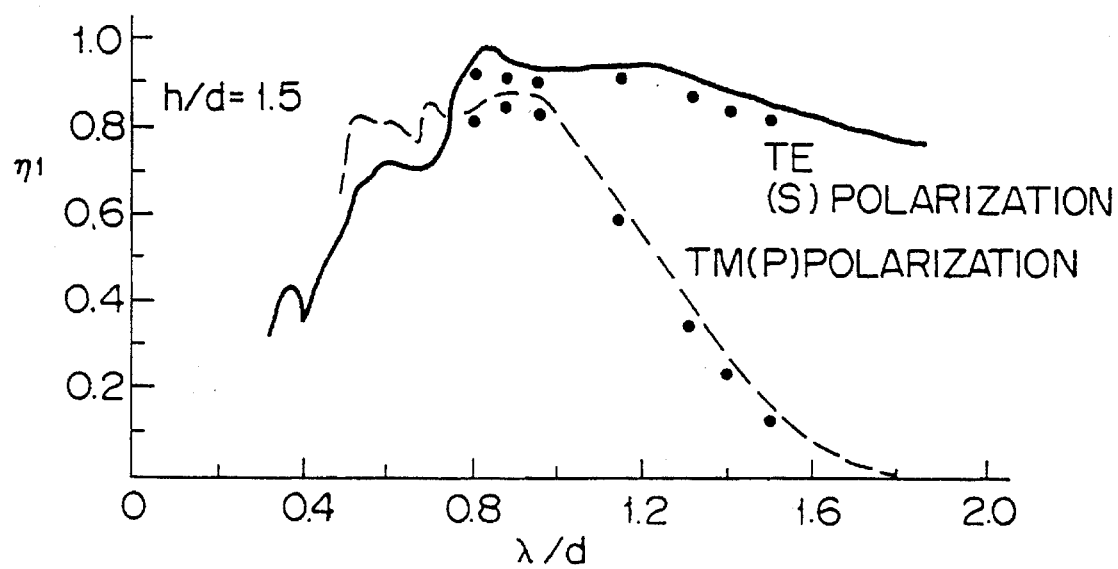
FIGS. 3(a) and 3(b) are a graph showing the variation of the holographic diffraction efficiency of a surface relief hologram, replicas of which can be easily produced, and a sectional view of the hologram, respectively.
Figure 3B:
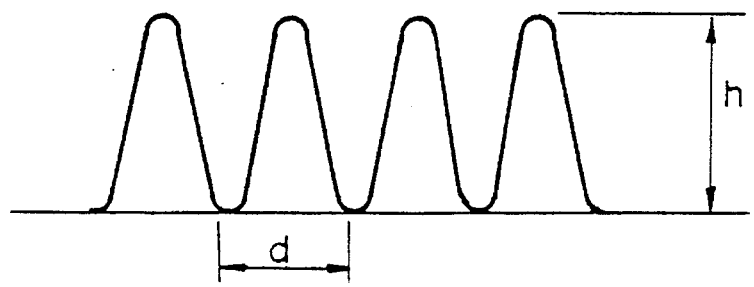

FIG. 3(a) is a graph showing the variation of holographic diffraction efficiency with the ratio $\lambda/d$ when a surface relief hologram is used (APPLIED OPTICS Vol. 3, No. 14, 2303–2310 (1984)). The replica of a surface relief hologram can be easily produced. As is obvious from FIG. 3(a), the holographic diffraction efficiency is dependent on the ratio $\lambda/d$. The respective modes of variation of the holographic diffraction efficiency with the ratio $\lambda/d$, for what is called an S-polarized light in which the direction of linear polarization is parallel to the grating direction and for what is called a P-polarized light in which the direction of linear polarization is perpendicular to the grating direction are different from each other, and the S-polarized light must be used for high diffraction efficiency when the ratio $\lambda/d$ is in the range of 1.4 to 1.5. FIG. 3(b) shows a section of a hologram, in which d is the grating constant of the holographic diffraction grating and h is the height of the same.

Figure 4A:
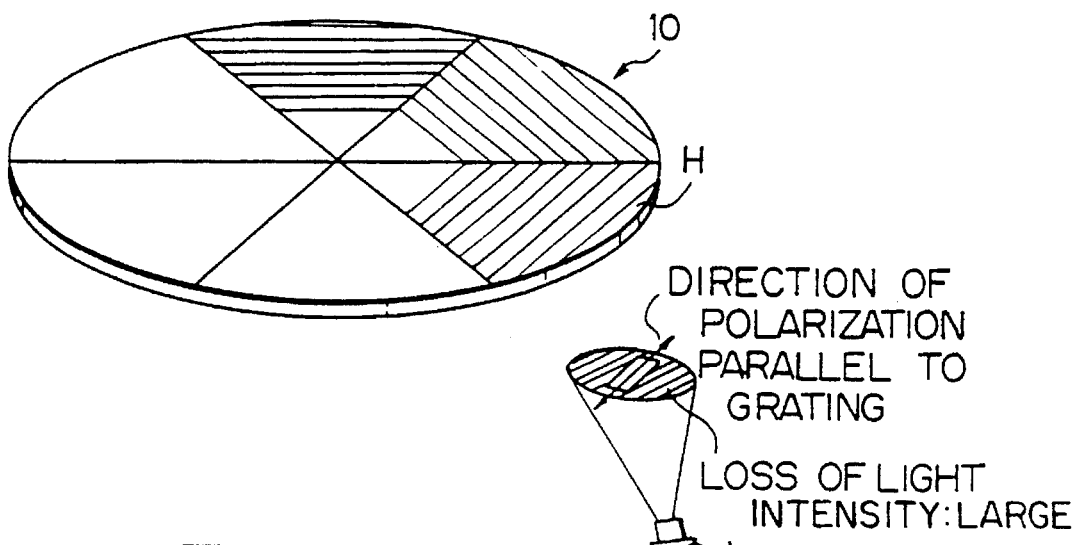
FIG. 4(a) is a perspective view showing the relative disposition of a rotary hologram plate and a semiconductor laser L, i.e., a light source, in which the semiconductor laser L is disposed so that the direction of polarization of a semiconductor laser emitted by the semiconductor laser L is parallel to the grating direction.
Figure 4B:
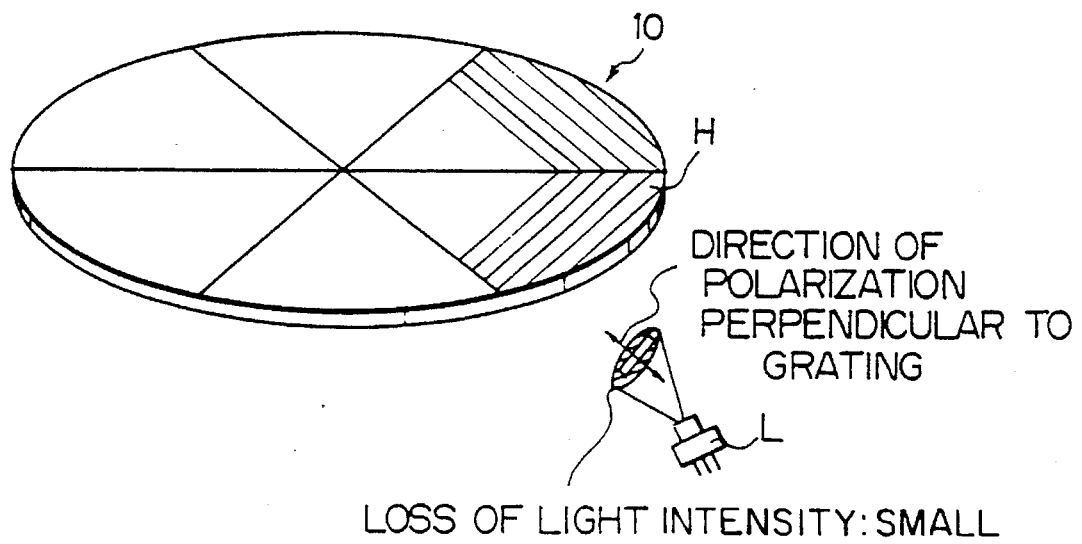
FIG. 4(b) is a perspective view showing the relative disposition of a rotary hologram plate and a semiconductor laser L, i.e., a light source in which the direction of polarization of a semiconductor laser emitted by the semiconductor laser L is perpendicular to the grating direction.

FIG. 4(a) shows a case such that the direction of polarization of a semiconductor laser L, i.e., a light source, is parallel to the grating direction of a grating and FIG. 4(b) shows case such that the direction of polarization of a semiconductor laser, i.e., a light source, is perpendicular to the grating direction of a grating. In FIGS. 4(a) and 4(b), indicated at 10 is a rotary hologram plate, at L is a semiconductor laser, i.e., a light source, and at H is a hologram. When a laser beam is projected so as to converge with respect to the feed direction, the loss in light intensity is large as shown in FIG. 4(a) because the size of the aperture of the semiconductor laser L along the feed direction is small. In the state shown in FIG. 4(b), the loss in light intensity is reduced significantly when the direction of polarization is parallel to the feed direction. However, since the laser beam is P-polarized light having a direction of polarization perpendicular to the grating direction of the grating in the latter case, the diffraction efficiency is very low, which is obvious from FIG. 3(a).

Such a problem may be solved by placing a half-wave plate ($\lambda/2$ plate) behind the semiconductor laser L thereby to turn the plane of polarization of the laser beam through 90°, which however increases the cost of the optical scanner. In some cases, it is difficult to separate a stamper from the base plate, when producing replicas of a surface relief hologram, when the grating constant of the grating is small.

As stated above, the holographic diffraction efficiency of an optical scanner using a hologram is dependent on the ratio λ/d, wherein λ is the wavelength of a laser beam employed therein and d is the grating constant of a holographic diffraction grating employed therein, and the respective modes of variation of the holographic diffraction efficiency with the ratio λ/d, for an S-polarized light and for a P-polarized light, are significantly different.

Figure 5:
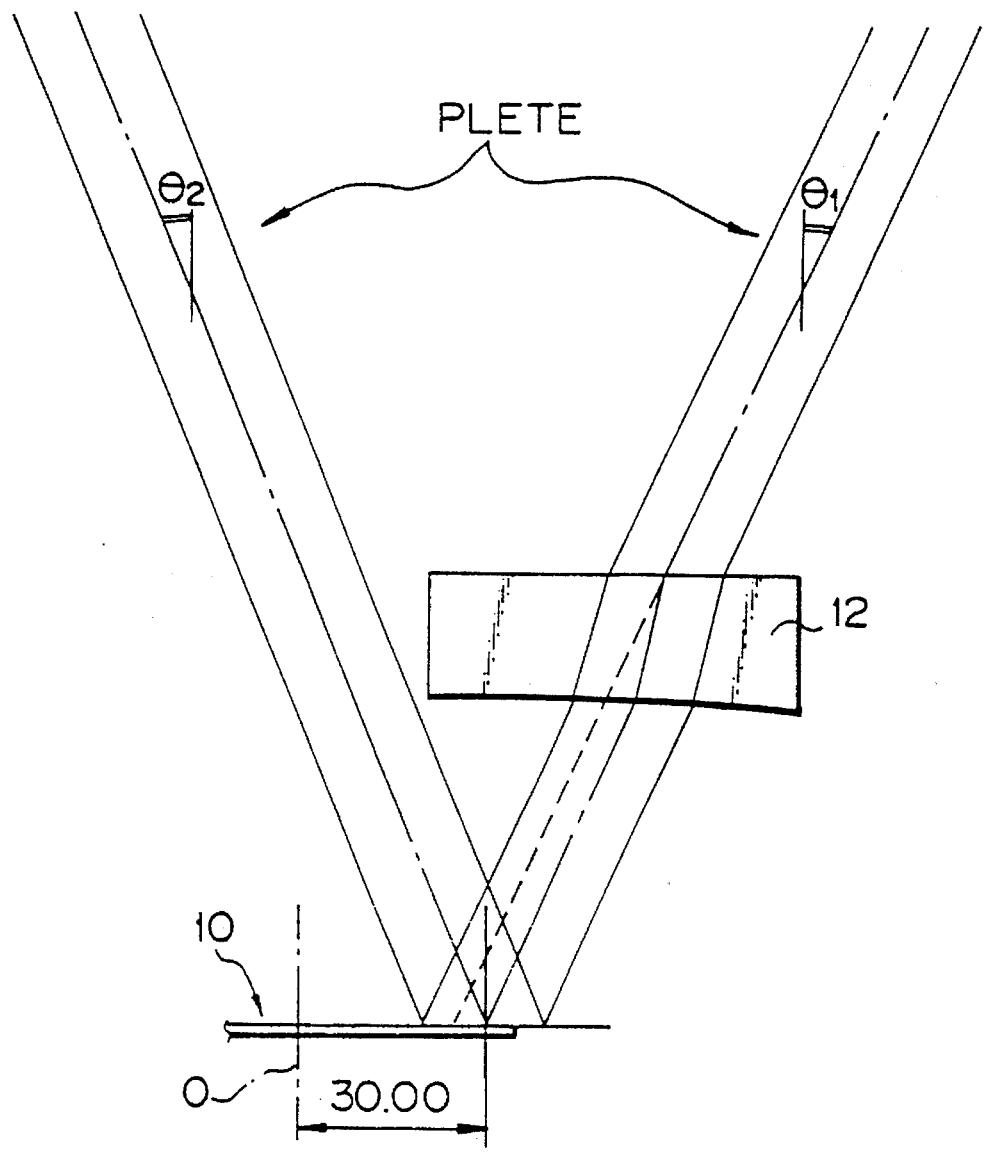
FIG. 5 is a diagrammatic view explaining a prior art hologram forming method.

A known hologram forming method will be described with reference to FIG. 5. In FIG. 5, there are shown a rotary hologram plate 10, a cylindrical lens 12 and an axis 0 of rotation of the rotary hologram plate 10. A wave that diverges only in the feed direction and a plane wave are used, respectively, as an object beam, or object wave, and a reference wave. The incident angles of the object wave and the reference wave are θ1 and η2, respectively.

In this known hologram forming method, when, for example, θ1=24 76°, θ2=23 44°, forming wavelength λ1=441.6 nm, and reconstructing wavelength λ1=785.0 nm, λ/d=1.4. As is obvious from FIG. 3(a), the diffraction efficiency of the diffraction grating for P-polarized light is not very high under such conditions. The diffraction efficiency for P-polarized light can be improved when the ratio λ/d is reduced to a value on the order of 0.8.

Figure 6:
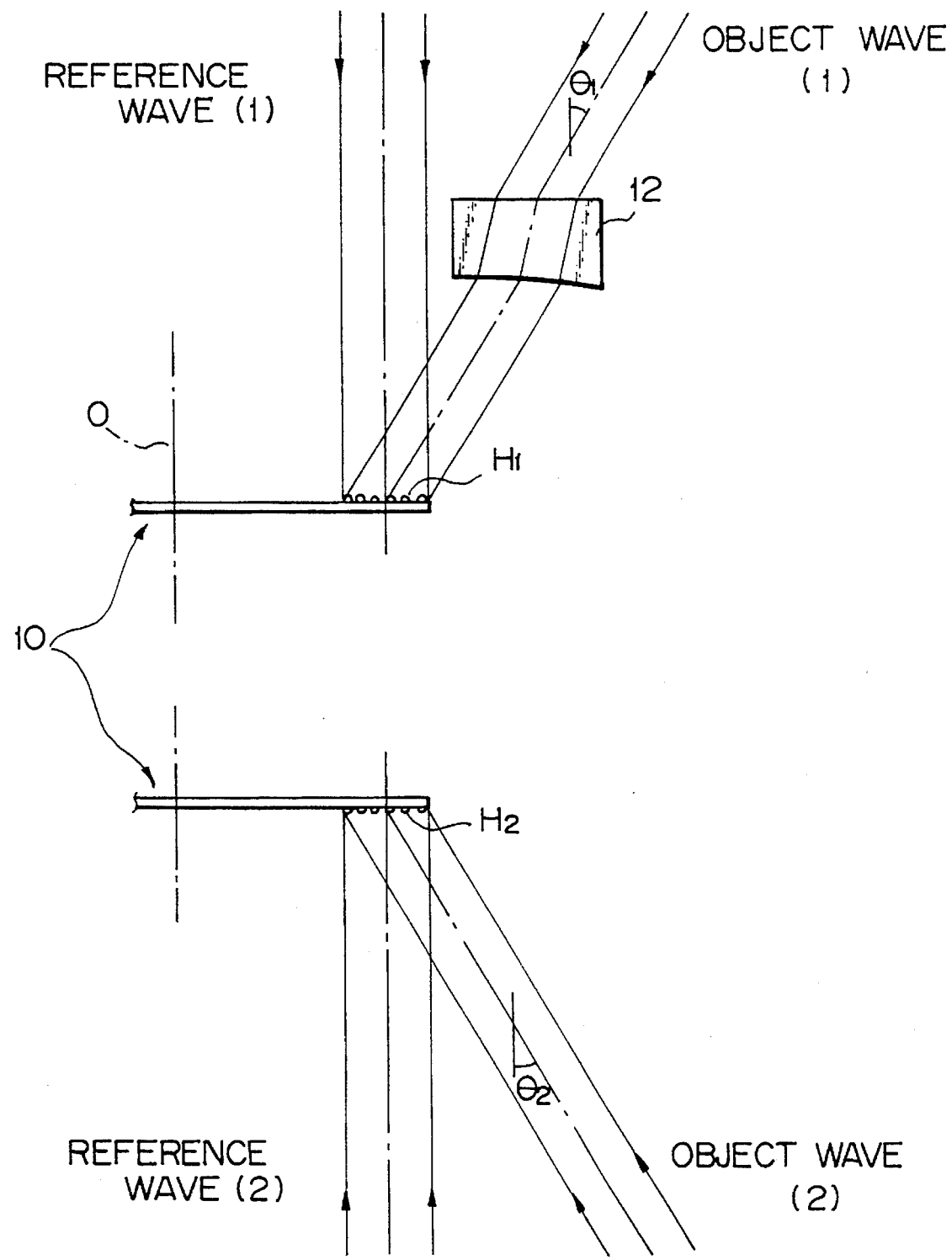
FIG. 6 is a diagrammatic view explaining a hologram forming method of a first embodiment according to the present invention.
Figure 7A:
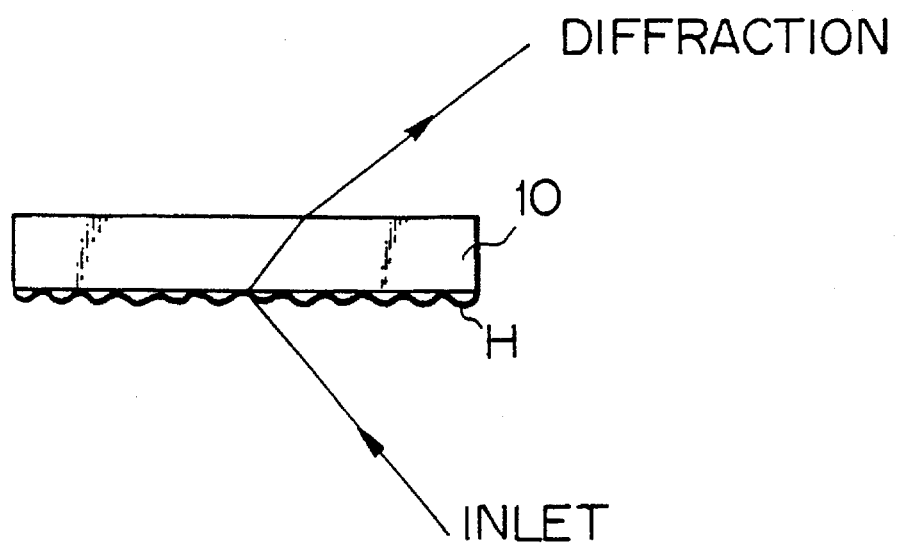
FIGS. 7(a) and 7(b) are side views of a prior art hologram and a hologram of the first embodiment according to the present invention, respectively.

FIG. 6 illustrates a hologram forming method of a first embodiment according to the present invention, which is one of the effective means for the improvement of the diffraction efficiency for P-polarized light. In FIG. 6, there are shown a rotary hologram plate 10, a cylindrical lens 12, the axis 0 of rotation of the rotary hologram plate 10, and holograms H1 and H2. The two holograms H1 and H2 are equivalent to one prior art hologram. An interference fringe pattern forming the first hologram is formed on one surface of a transparent hologram base plate by using a plane wave perpendicular to the base plate (reference wave 1) and a wave having an aberration and falling on the surface at an incident angle θ1 (object wave 1). An interference fringe pattern forming the second hologram is formed on the other surface of the transparent hologram plate by a plane wave perpendicular to the base plate (reference wave 2) and a wave having an aberration and falling on the surface at the incident angle θ2 different from the incident angle θ1 (object wave 2). The functions of the rotary hologram plate 10 provided with the two holograms, respectively, on the opposite surfaces thereof are equivalent to those of a prior art rotary hologram plate provided with one hologram H on one surface thereof as shown in FIG. 7(a). In FIG. 7(a), λ/d=1.4 to 1.5, and η=0.15.

Figure 7B:
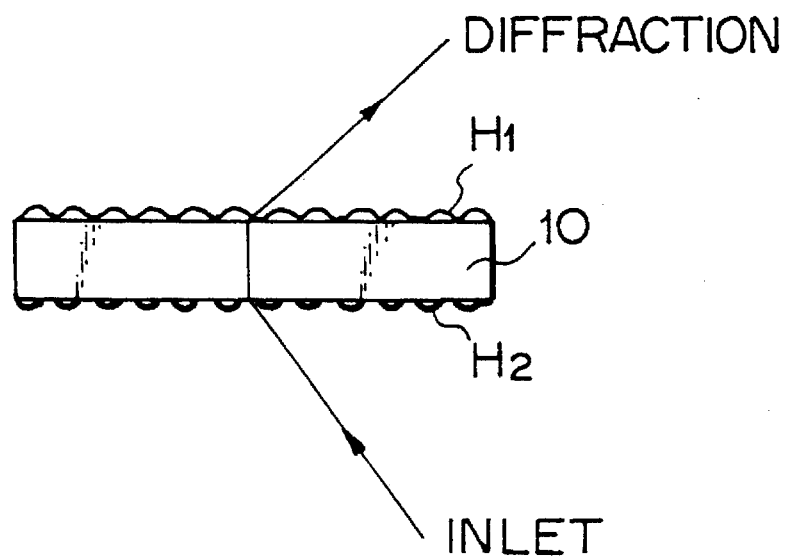

When this rotary hologram plate 10 is used, a laser beam incident on one surface of the base plate is diffracted by the second hologram H2, the laser beam is diffracted again by the first hologram H1, and then the laser beam goes out through the other surface of the base plate from the rotary hologram plate 10. Since the ratio λ/d with the first hologram H1 is 0.7, both the diffraction efficiencies for P-polarized light and S-polarized light are on substantially the same high level, which is obvious from FIG. 3. Since the ratio λ/d with the second hologram H2 is 0.7, the diffraction efficiencies of the second hologram H2 for P-polarized light and S-polarized light, similarly to those of the first hologram H1, are on a high level. Thus, as shown in FIG. 7(b), the functions of the rotary hologram plate 10 are equivalent to those of the prior art rotary hologram plate, and the rotary hologram plate 10 is capable of diffracting P-polarized light at a high diffraction efficiency. The replicas of the rotary hologram plate 10 can be easily produced by mass production. In FIG. 7(b), λ/d=0.75, η=0.8 for one hologram, and η=0.64 for two holograms.

Figure 8:
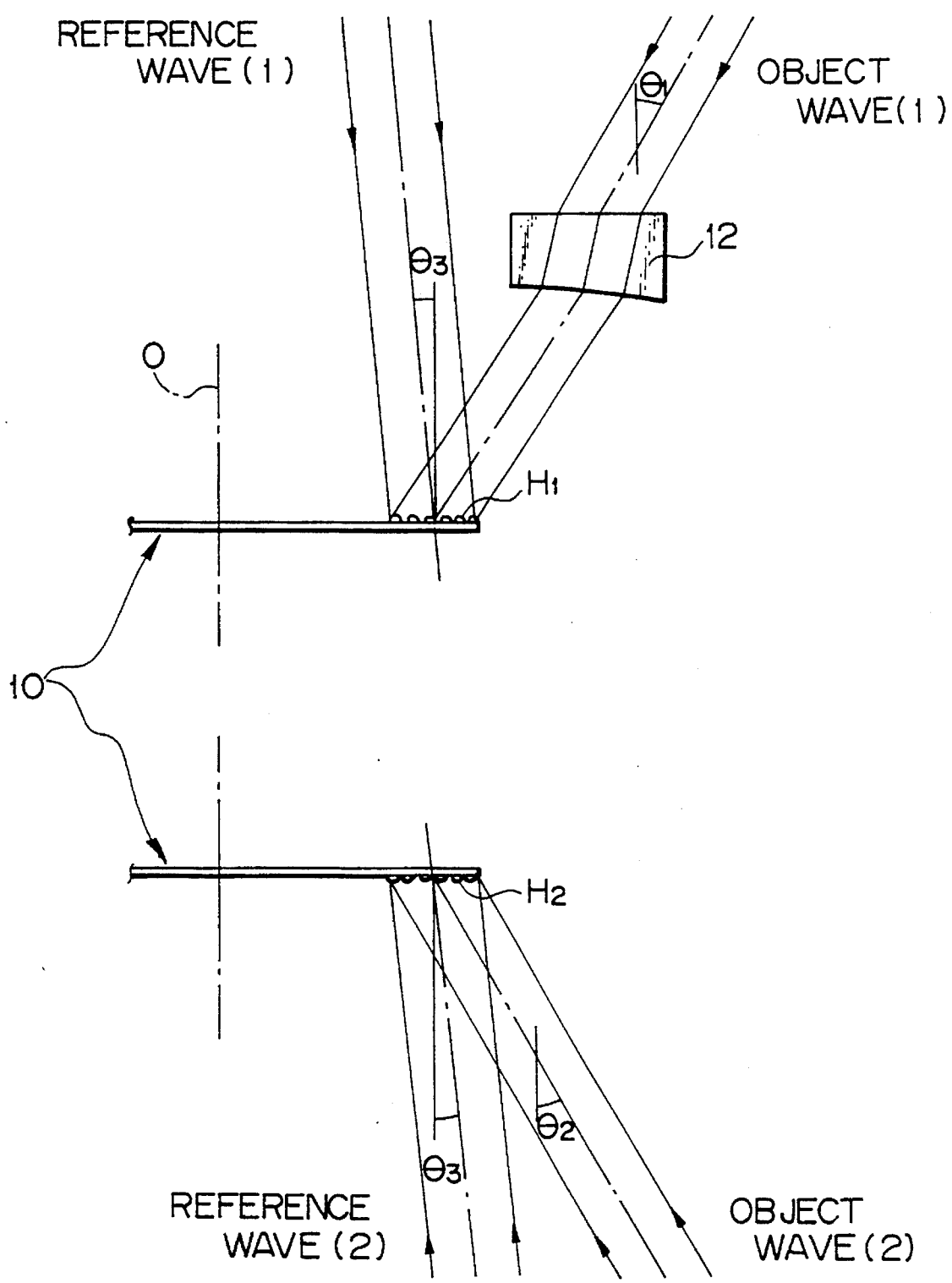
FIG. 8 is a diagrammatic view explaining a hologram forming method of a second embodiment according to the present invention.

FIG. 8 illustrates a hologram forming method of a second embodiment according to the present invention, which is similar to that in the first embodiment, except that reference waves 1 and 2, which are plane waves, fall on the surface of a base plate at the same incident angle θ3 in the second embodiment. In the second embodiment, the common incident angle θ3, at which the reference waves 1 and 2 fall on the surface of the base plate is changed to facilitate alignment of the component of the optical exposure system in forming a hologram.

Figure 9:
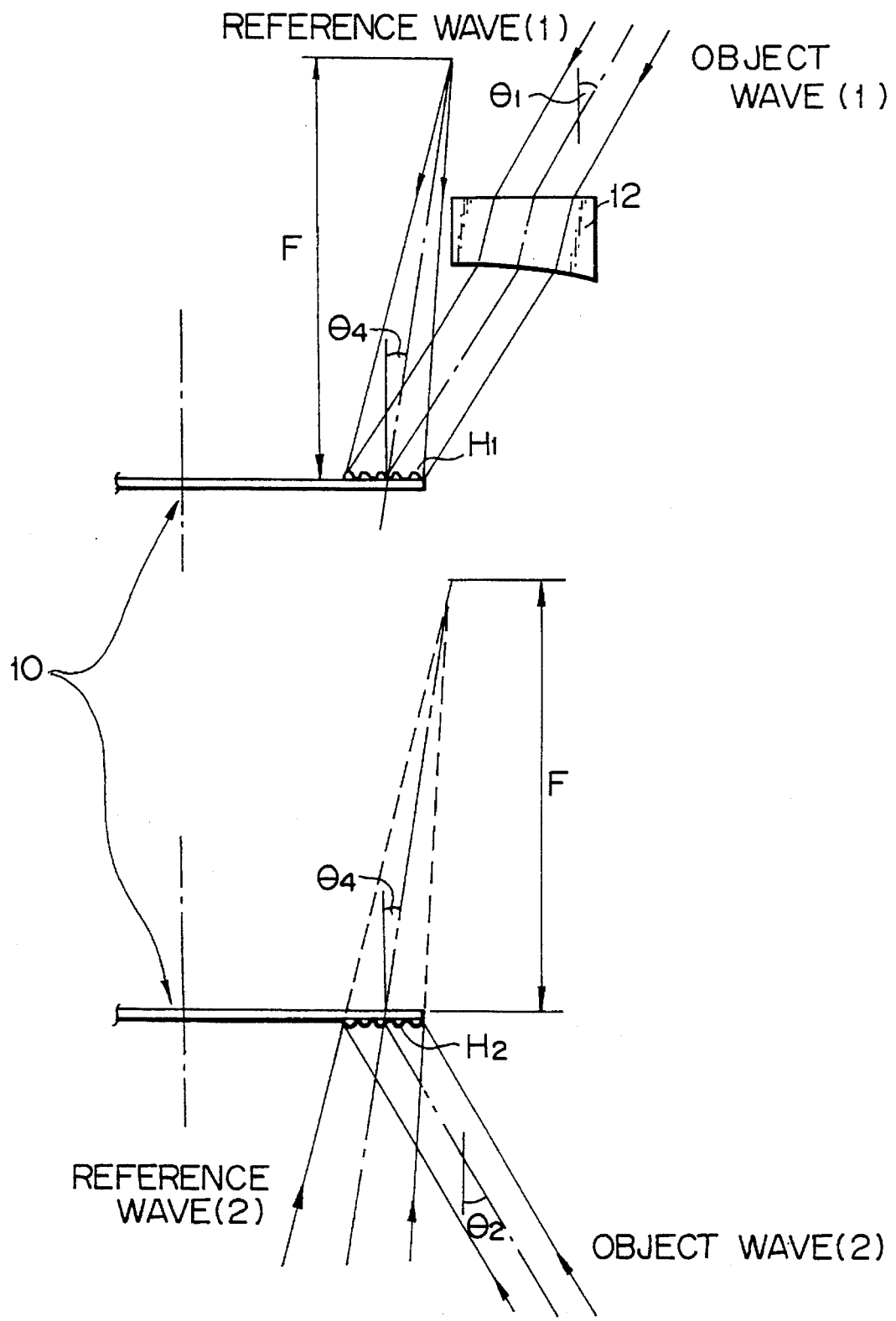
FIG. 9 is a diagrammatic view explaining a hologram forming method of a third embodiment according to the present invention.

FIG. 9 illustrates a hologram forming method of a third embodiment according to the present invention. A reference wave 1 used in this embodiment is a divergent spherical wave that has a focal length F and falls on the surface of a base plate at an incident angle 84, and a reference wave 2 is a convergent spherical wave having the same focal length F and falling on the surface of the base plate at the same incident angle 84. In the third embodiment, either the focal length Z or the incident angle θ4 is changed so as to facilitate alignment of the component of the optical exposure system.

Figure 10:
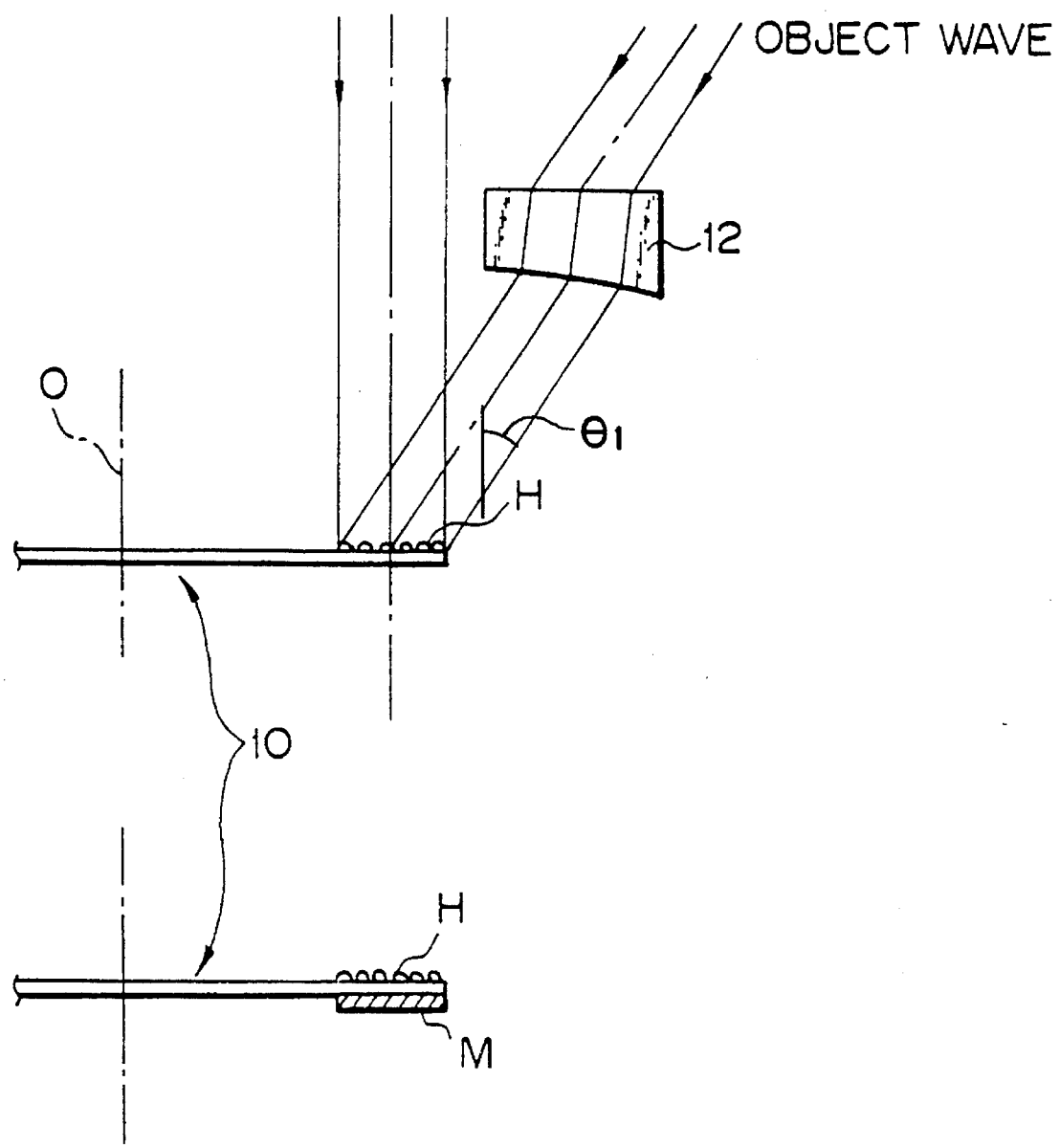
FIG. 10 is a diagrammatic view explaining a hologram forming method of a fourth embodiment according to the present invention.

FIG. 10 illustrates a hologram forming method of a fourth embodiment according to the present invention, which is different from the foregoing embodiments. In the fourth embodiment, an interference fringe pattern of a hologram H, which is similar to the first hologram H1 formed by the hologram forming method in the first embodiment, is formed on one surface of a transparent base plate by a plane wave perpendicular to the surface of the base plate (reference wave) and a wave having an aberration and falling on the surface of the base plate at an incident angle θ1. An aluminum film is deposited by evaporation on the other surface of the base plate to form a mirror M. Since the ratio λ/d with the hologram H of the rotary hologram thus formed is 0.7, the diffraction efficiency of the hologram H for P-polarized light is about equal to that for S-polarized light.

Figure 11A:
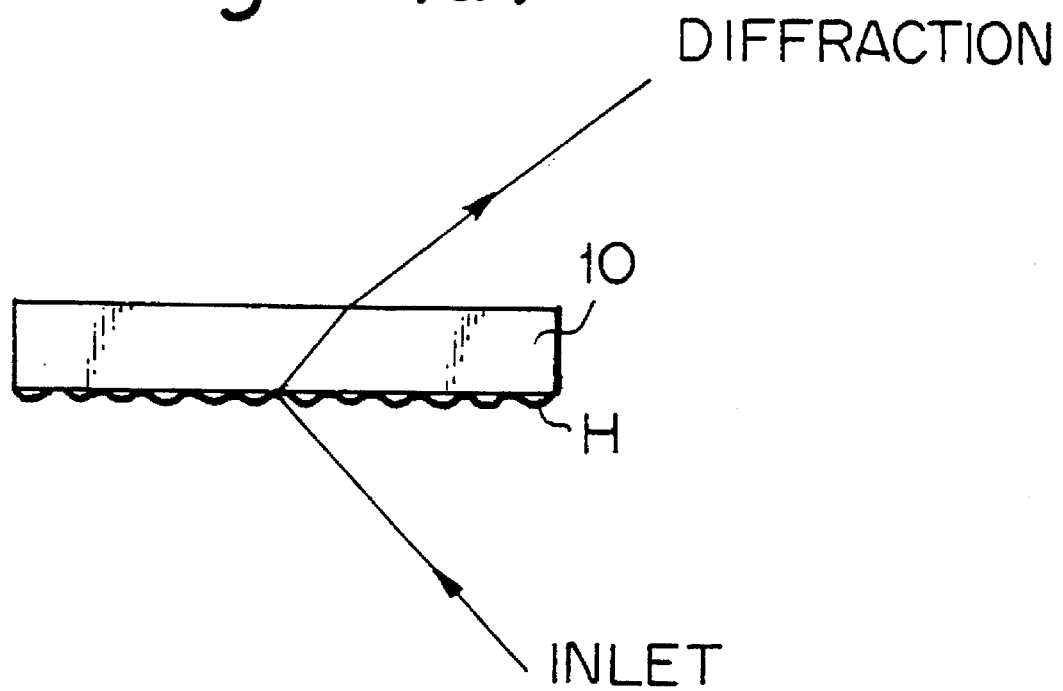
FIGS. 11(a) and 11(b) are views explaining the functions of a hologram formed by the hologram forming method of the fourth embodiment illustrated by FIG. 10 in comparison with those of a prior art hologram plate, respectively.
Figure 11B:
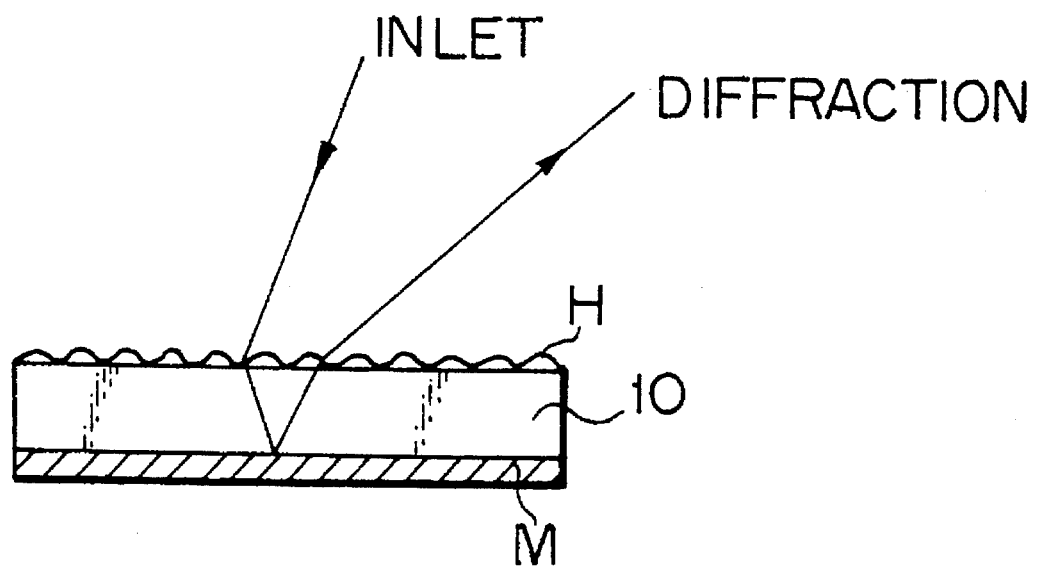

FIGS. 11(a) and 11(b) are respective views explaining the functions of the rotary hologram plate formed by the hologram forming method of the fourth embodiment compared with those of a prior art rotary hologram plate. As shown in FIG. 11(b), since light diffracted by the hologram H formed on one of the surfaces of the base plate is reflected by the mirror M formed on the other surface of the base plate so as to be diffracted again by the hologram H, the ratio λ/d may be 0.7. Accordingly, the hologram H is capable of diffracting light with high diffraction efficiency.

FIGS. 12(a) and 12(b) illustrates a hologram forming method of a fifth embodiment according to the present invention. As shown in FIG. 12(a), when a fixed hologram plate 20 has a high spatial frequency, the base plate of the fixed hologram plate 20 has a significant length. Therefore, it is difficult, in some cases, to separate a stamper from the base plate when producing a replica of the fixed hologram plate 20. In such a case, a hologram similar to those formed by the methods in the foregoing embodiments is formed on the base plate by additionally using a new reference wave, such as a plane wave perpendicular to the surface of the base plate, to reduce the ratio λ/d with the hologram, which enables the stamper to be easily separated from the base plate.

As is apparent from the foregoing description, according to the present invention, so called P-polarized light, as well as so called S-polarized light, can be diffracted with high diffraction efficiency and hence the reduction of the quantity of light on an image forming surface as occurs in the prior art can be prevented. Furthermore, since the optical scanner need not be provided with any λ/2 plate, the optical scanner can be manufactured at a relatively low cost. Still further, since the spatial frequency of the hologram employed by the present invention is approximately half that of the prior art hologram, the stamper can be easily separated from the base plate when producing a replica of the hologram.

We claim:

1. An optical scanner comprising:

a transparent rotary plate having first and second opposite surfaces and first and second holograms respectively formed on the first and second opposite surfaces;

a laser beam source which generates a laser beam, a transparent, fixed plate having a hologram thereon;

an image forming surface having a feed direction;

the laser beam source and the rotary and fixed plates being positioned in mutual, relative relationship such that the laser beam, as generated by the laser beam source, is projected so as to converge on the first surface of the transparent rotary plate and have a direction of polarization which is perpendicular to the grating direction of the center of scanning thereon, so as to pass through the transparent rotary plate and thereby, in succession, to pass through and be diffracted by the first and second holograms, so as to pass through the transparent fixed plate and the hologram thereon and be further diffracted thereby and so as to be incident and converge on the image forming surface and to scan same in a direction perpendicular to the feed direction;

each of the first and second holograms having a holographic diffraction grating having a grating constant, d, and where $\lambda$ is the wavelength of the laser beam, the ratio $\lambda/d$ is in the range of 0.4 to 1.1;

the first hologram being formed on the first surface of the transparent rotary plate by one of:

(1) a plane wave incident thereon in a direction perpendicular to the first surface and a second wave incident thereon and having an aberration of a first angle relatively to the first surface of the transparent rotary plate, or (2) a plane wave incident thereon in a direction defined by a third angle relatively to the first surface of the transparent rotary plate and a second wave having an aberration of the first angle relatively to the first surface; and the second hologram being formed on the second surface of the transparent rotary plate by one of:

(1) a plane wave incident thereon in a direction perpendicular to the second surface and a second wave incident thereon and having an aberration of a second angle, different from the first angle, relatively to the second surface, or (2) a plane wave incident thereon at the third angle relatively to the second surface and a plane wave incident thereon at the second angle, different from the first angle, relatively to the second surface.

2. An optical scanner comprising:

a transparent rotary plate having first and second opposite surfaces and first and second holograms respectively formed on the first and second opposite surfaces;

a transparent, fixed plate having a hologram thereon;

an image forming surface having a feed direction;

a laser beam source which generates a laser beam, the laser beam source and the rotary and fixed plates being positioned in mutual, relative relationship such that the laser beam, as generated by the laser beam source, is projected so as to converge on the first surface of the transparent rotary plate and have a direction of polarization which is perpendicular to the grating direction of the center of scanning thereon, so as to pass through the transparent rotary plate and thereby, in succession, to pass through and be diffracted by the first and second holograms so as to pass through the transparent fixed plate and the hologram thereon and be further diffracted thereby and so as to be incident and converge on the image forming surface and to scan same in a direction perpendicular to the feed direction;

each of the first and second holograms having a holographic diffraction grating having a grating constant, d, and where $\lambda$ is the wavelength of the laser beam, the ratio $\lambda/d$ is in the range of 0.4 to 1.1;

the first hologram being formed on the first surface of the transparent rotary plate by a divergent spherical wave incident thereon in a direction defined by a first angle relatively to the first surface and having a predetermined focal length, and a second wave incident thereon and having an aberration of a second angle relatively to the first surface; and the second hologram being formed on the second surface of the transparent rotary plate by a convergent spherical wave incident thereon at the first angle relatively to the second surface and having the same predetermined focal length and a plane wave incident thereon at a third angle, different from the second angle, relatively to the second surface.

3. An optical scanner comprising:

a transparent rotary plate having first and second opposite surfaces and a first hologram and a mirror respectively formed on the first and second opposite surfaces;

a transparent, fixed plate having a second hologram thereon;

an image forming surface having a feed direction;

a laser beam source which generates a laser beam, the laser beam source and the rotary and fixed plates being positioned in mutual, relative relationship such that the laser beam, as generated by the laser beam source, is projected so as to converge on the first surface of the transparent rotary plate and to pass in a first direction through the first hologram and the transparent rotary plate and to be incident on the mirror, the laser beam being reflected by the mirror and passing in a second direction opposite to the first direction, through the transparent rotary plate and the first hologram, the laser beam being diffracted first and second times in passing through the first hologram respectively in the first and second directions and a third time in passing through the second hologram and being incident on, and converging on, the image forming surface and thereby scanning same in a direction perpendicular to the feed direction; and each of the first and second holograms having a holographic diffraction grating having a grating constant, d, and where $\lambda$ is the wavelength of the laser beam, the ratio $\lambda/d$ is in the range of 0.4 to 1.1.

* * * * *

UNITED STATES PATENT AND TRADEMARK OFFICE
CERTIFICATE OF CORRECTION

PATENT NO. : 5,550,655

DATED : August 27, 1996

INVENTOR(S) : Kayashima, et al

It is certified that error appears in the above-identified patent and that said Letters Patent is hereby corrected as shown below:

On the title page, item [56], under Reference Cited, U.S. Patent Documents insert the following:

4,245,882   01/20/81   CHANG insert under Foreign Patent Documents, the following:

| | | |
|---|---|---|
| 60-11802 | 01/22/85 | JAPAN |
| 63-262614 | 10/28/88 | JAPAN |
| 0 334 631 | 09/27/89 | EUROPEAN PATENT OFFICE | insert under Other Publications, the following:

*PATENT ABSTRACTS OF JAPAN*, Vol. 8, No. 31 (P-253)[1468] February 9, 1984 & JP-A-58 184925 (HITACHI) October 28, 1983.

*PATENT ABSTRACTS OF JAPAN*, Vol. 8, No. 92 (P-271)[1529] April 27, 1984 & JP-A-59 7333 (RICHO) January 14, 1984.

*IBM TECHNICAL DISCLOSURE BULLETIN*, Vol. 29, No. 8, "Straight-Line, Two-Dimensional Holographic Scanner," January 1987, New York, NY, pages 3673-3674.

*PATENT ABSTRACTS OF JAPAN*, Vol. 12, No. 99 (E-594) March 31, 1988 & JP-A-62 230074 (MATSUSHITA) October 8, 1987.

*PATENT ABSTRACTS OF JAPAN*, Vol. 13, No. 448 (P-942) October 9, 1989 & JP-A-1 172902 (MATSUSHITA) July 7, 1989.

*PATENT ABSTRACTS OF JAPAN*, Vol. 15, No. 466 (P-1280) November 26, 1991 & JP-A-3 198020 (MATSUSHITA) August 29, 1991.

UNITED STATES PATENT AND TRADEMARK OFFICE
CERTIFICATE OF CORRECTION

PATENT NO. : 5,550,655
DATED : Aug. 27, 1996
INVENTOR(S) : KAYASHIMA et al.

It is certified that error appears in the above-indentified patent and that said Letters Patent is hereby corrected as shown below:

Col. 3, line 54, change "The" to --the--.

Col. 4, line 62, change "which however" to --which, however,--.

Col. 5, line 16, change "$\theta 1 = 24\ 76°, \theta 2 = 23\ 44°$" to --$\theta 1 = 24.76°, \theta 2 = 23.44°$--.

Col. 6, line 13, change "84" to --$\theta 4$--;
       line 16, change "84" to --$\theta 4$--;
       line 17, change "length Z" to --length F--.
Col. 7, line 39, the space should be deleted.

Signed and Sealed this

Fifteenth Day of April, 1997

*Attest:*

BRUCE LEHMAN

*Attesting Officer*      *Commissioner of Patents and Trademarks*